United States Patent
Chiang et al.

(10) Patent No.: US 11,810,421 B2
(45) Date of Patent: *Nov. 7, 2023

(54) DATABASE GAME PLAYING SYSTEM BASED ON PREGENERATED DATA

(71) Applicant: 2 HH, LLC, Monterey park, CA (US)

(72) Inventors: Wayne Chiang, Monterey Park, CA (US); Charles Chang, South Pasadena, CA (US)

(73) Assignee: 2 HH, LLC, Monterey Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,737

(22) Filed: Aug. 1, 2022

(65) Prior Publication Data

US 2022/0366761 A1    Nov. 17, 2022

Related U.S. Application Data

(63) Continuation of application No. 17/178,144, filed on Feb. 17, 2021, now Pat. No. 11,436,891, which is a continuation of application No. 16/442,322, filed on Jun. 14, 2019, now Pat. No. 10,930,111, which is a continuation of application No. 15/481,348, filed on Apr. 6, 2017, now Pat. No. 10,360,759.

(51) Int. Cl.
| | | |
|---|---|---|
| *G07F 17/32* | (2006.01) | |
| *G06N 20/00* | (2019.01) | |
| *G06F 16/9535* | (2019.01) | |
| *G06F 16/435* | (2019.01) | |
| *H04L 67/60* | (2022.01) | |
| *H04L 67/131* | (2022.01) | |

(52) U.S. Cl.
CPC ........ *G07F 17/3239* (2013.01); *G06F 16/435* (2019.01); *G06F 16/9535* (2019.01); *G06N 20/00* (2019.01); *G07F 17/323* (2013.01); *G07F 17/3223* (2013.01); *G07F 17/3293* (2013.01); *H04L 67/131* (2022.05); *H04L 67/60* (2022.05)

(58) Field of Classification Search
CPC ............. G07F 17/3239; G07F 17/3223; G07F 17/323; G07F 17/3293; G06F 16/435; G06F 16/9535; G06N 20/00; H04L 67/131; H04L 67/60
See application file for complete search history.

(56) References Cited

U.S. PATENT DOCUMENTS

| | | |
|---|---|---|
| 5,374,067 A | 12/1994 | Jones |
| 6,056,641 A | 5/2000 | Webb |
| 7,771,274 B2 | 8/2010 | Walker et al. |
| 2002/0138461 A1 | 9/2002 | Sinclair et al. |
| 2006/0151952 A1 | 7/2006 | Encinas |

*Primary Examiner* — Kevin Y Kim
(74) *Attorney, Agent, or Firm* — James Young Hurt; Sheppard Mullin Richter & Hampton LLP

(57) ABSTRACT

A database system is disclosed for accessing databases, updating hands information associated with users. The database system can include a server. The server can retrieve and store data in the database. The server can retrieve a first request from a first computer over a network, the first request including a first set of authentication data. The server can identify the user and retrieve a first set of hands information data associated with the user from the database. The server can generate a first set of game data and transmit the game data to the first computer. It can then receive a first set of hands data from the first computer. It can compute a first game result based on the first set of hands data, the first set of game data and a first set of game rules.

20 Claims, 11 Drawing Sheets

Static Game Database
START Database Table/Collection (pregenerated, static data set) ⟵ 190

| START-ID | PLAYER-HAND | COMMUNITY-CARDS | DECK |
|---|---|---|---|
| 1 | AsAhAd | AcKsKh | KdKcQsQhQdQcJsJhJdJc... |
| . | ... | ... | ... |
| . | ... | ... | ... |
| 5005 | As9h2c | Ks8s7d | AhAdAcKhKdKcQsQhQdQc... |
| . | ... | ... | ... |
| . | ... | ... | ... |
| 407,170,400 | 2h2d2c | 3d3c2s | AsAhAdAcKsKhKdKcQsQhQdQc... |

Dynamic Database ⟵ 192
GAME Table/Collection

| GAME-ID | START-ID | PLAYER-CHOICE | DEALER-HAND |
|---|---|---|---|
| 1 | 5005 | 7d | Qs7h2c |
| . | ... | ... | .. |

DATABASE GAME PLAYING SYSTEM BASED ON PREGENERATED DATA

CROSS-REFERENCE TO RELATED APPLICATIONS

This application is a continuation of U.S. patent application Ser. No. 17/178,144, filed Feb. 17, 2021, which is a continuation of U.S. patent application Ser. No. 16/442,322, filed Jun. 14, 2019 (issuing as U.S. Pat. No. 10,930,111), which is a continuation of U.S. patent application Ser. No. 15/481,348, filed Apr. 6, 2017 (issued as U.S. Pat. No. 10,360,759), both titled "DATABASE GAME PLAYING SYSTEM BASED ON PREGENERATED DATA." The entirety of above-identified applications are hereby incorporated by reference herein and made part of this specification for all that they disclose.

BACKGROUND

Casino card games such as Baccarat & Pai Gow have become increasingly popular over the last few decades. Given the demand for such card games, many new casino card games have been invented in recent years. Mobile applications offer users an easy way to learn new card games without having to play against other humans, while also giving users the chance to simulate a traditional casino setting.

SUMMARY

In general, a game playing system (also referred to as the "system") is described. The term "game" in "game playing system" is meant to be broad and cover any type of card game, including, but not limited to, the card game "Badugi Chase" disclosed below. The traditional Badugi poker game rules are hereby incorporated in this application in its entirety.

In one embodiment, the game playing system allows individuals to play various novel card games against a server. For example, an individual may wish to learn the rules of one of the available games without having to compete against another individual. Such an individual can login to the system and request to play a single user card game. In that case, the individual would compete against the server.

In one embodiment, the game playing system allows individuals to play various novel card games against other individuals. For example, an individual, after learning the rules of the card games through playing single user games, may wish to compete against other individuals. Such an individual can login to the system and request to play a multiuser card game. In that case, the individual would compete against one or more other individuals.

In one embodiment, the game playing system gives individuals a choice to play various novel card games either against the server, or against other individuals. For example, a user, after logging in to the system, can request to play either a single or a multiuser card game. Depending on the user's selection, the individual would either be competing against the server, or against other users.

In all of the embodiments described above, a user who wishes to play a game on the game playing system may do so through a software application running on any type of computing device, including a mobile computing device (such as a smartphone, laptop, tablet, and the like). For example, the user may log in to the software application and submit a request to play a one-user or multi-user game, perform actions, receive game data from a server as described below, and the like. Alternatively, a user may interact with the system though, for example, a network browser application operating on a computing device.

In certain embodiments, A database processing system including a server and a data repository including one or more databases, the data repository comprising a first database configured to store user information of a plurality of users; a second database configured to store a plurality of sets of pregenerated game data, wherein each of the set of pregenerated game data further comprising data associated with three user cards, three community cards and forty six cards in a remaining deck; and the server configured to: generate, in response to a first request from a user via a first computing device over a network to play a game, a first plurality of unique identifiers, wherein each of the unique identifiers corresponds to a set of pregenerated game data; retrieve a first set of pregenerated game data associated with a first unique identifier of the first plurality of unique identifiers; transmit to the first computing device a first set of three user cards and a first set of three community cards associated with the first set of pregenerated game data; generate, in response to a first interaction from the user via the first computing device over the network, a first set of three dealer cards, wherein the first interaction comprising picking a card from the first set of three community cards; compute and transmit to the first computing device, a first game result based on a first user hand comprising the first set of three user cards and the picked card from the first set of three community cards, a first dealer hand comprising the first set of three dealer cards and two remaining cards from the first set of three community cards, and a first set of game rules, wherein the first set of game rules comprising comparing suits and ranks between a first user hand and a first dealer hand; retrieve, in response to a second request from the user to play the game, a second set of pregenerated game data associated with a second unique identifier of the first plurality of unique identifiers from the data repository; transmit to the first computing device, a second set of three user cards and a second set of three community cards associated with the second set of pregenerated game data; generate, in response to a second interaction from the user via the first computing device over the network, a second set of three dealer cards, wherein the second interaction comprising picking a card from the second set of three community cards; and compute and transmit to the first computing device, a second game result based on a second user hand comprising the second set of three user cards and the picked card from the second set of three community cards, a second dealer hand comprising the second set of three dealer cards and two remaining cards from the second set of three community cards, and the first set of game rules, wherein the first set of game rules comprising comparing suits and ranks between the second user hand and the second dealer hand.

Additionally, in various embodiments, a database processing method executed on a server to retrieve and store data in one or more databases of a data repository, the database processing method comprising: storing user information of a plurality of users in a first database; storing a plurality of sets of pregenerated game data in a second database, wherein the set of pregenerated game data further comprising data associated with three cards for the user, three community cards and forty six cards in a remaining deck; generating, in response to a first request from a user via a first computing device over a network to play a game, a first plurality of unique identifiers, wherein each of the unique identifiers corresponds to a set of pregenerated game data; retrieving a first set of pregenerated game data associated with a first unique identifier of the first plurality of unique identifiers; transmitting to the first computing device a first set of three user cards and a first set of three community cards associated with the first set of pregenerated game data; generating, in response to a first interaction from the user via the first computing device over the network, a first set of three dealer cards, wherein the first interaction comprising picking a card from the first set of three community cards; computing and transmit to the first computing device, a first game result based on a first user hand comprising the first set of three user cards and the picked card from the first set of three community cards, a first dealer hand comprising the first set of three dealer cards and two remaining cards from the first set of three community cards, and a first set of game rules, wherein the first set of game rules comprising comparing suits and ranks between a first user hand and a first dealer hand; retrieving, in response to a second request from the user to play the game, a second set of pregenerated game data associated with a second unique identifier of the first plurality of unique identifiers from the data repository; transmitting to the first computing device, a second set of three user cards and a second set of three community cards associated with the second set of pregenerated game data; generating, in response to a second interaction from the user via the first computing device over the network, a second set of three dealer cards, wherein the second interaction comprising picking a card from the second set of three community cards; and computing and transmitting to the first computing device, a second game result based on a second user hand comprising the second set of three user cards and the picked card from the second set of three community cards, a second dealer hand comprising the second set of three dealer cards and two remaining cards from the second set of three community cards, and the first set of game rules, wherein the first set of game rules comprising comparing suits and ranks between the second user hand and the second dealer hand.

DETAILED DESCRIPTION

The term "Badugi Chase" as used herein should be interpreted to mean a single or multiuser card game, one set of rules of which is described below. A "single user game" should be interpreted to mean that a user plays against a dealer. A "multi user game" should be interpreted to mean that a user plays against one or more other users.

When playing a poker game (e.g., Badugi Chase) in a computing environment, it is generally difficult for users to learn the new rules, efficient betting methods, or effective betting behaviors. This present disclosure presents a new way of teaching users how to play poker games in the computing environment. The present disclosure presents an advisor feature in the computing environment. The advisor feature can enable users to learn how to play a poker game more efficiently. The advisor feature can also help users to place a bet more wisely.

Generally, playing a poker game e.g., Badugi Chase) in a computing environment also faces various technical problems, such as longer processing time due to the need of shuffling a new deck of cards. The present disclosure presents a solution to these problems. The present disclosure presents a system that uses pregenerated game data. By using static game data and dynamic game data, the present disclosure presents a gaming system that can process hundreds of million sets of game data during a single process period and achieving better efficiencies.

FIGURES

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Example Systems, Components, and Network Environment

Figure 1A:
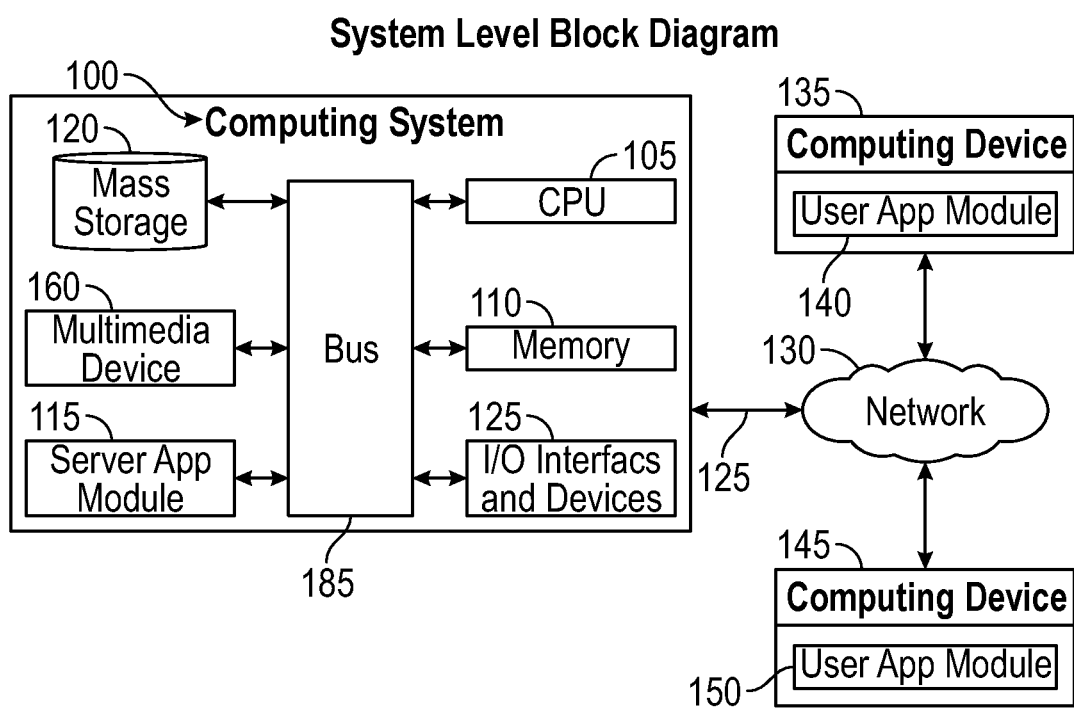
FIG. 1A is a block diagram showing an embodiment of a game playing system.

FIG. 1A is a block diagram showing an embodiment of a game playing system. The game playing system may include a game playing computing system 100 ("computing system 100"), a communication link 125, a network 130, and multiple computing devices, including a computing device 135 and a computing device 145. The computing system 100 may include a central processing unit (CPU) 105, input/output (I/O) interfaces and devices 125, a mass storage device 120, a memory 110, multimedia devices 160, a bus 185, and a server application module 115. Computing devices 135 and 145 may include user device application modules 140 and 150.

In the game playing system ("the system") of FIG. 1A the computing system 100 and computing devices 135 and 140 are in communication with the network 130. The communication link 125 may be any type of wired or wireless communications link between the various components of the game playing system and the network 130. The computing system 100 and/or the computing devices 135 and 140 may be used to implement various systems and methods described herein. Additionally, while various components of the computing system 100 are described in detail below, it is to be understood that the computing device 135 may include various similar components, as described.

The computing system 100 may include computing devices, for example, a personal computer that is IBM, Macintosh, or Linux/Unix compatible or a server or workstation. In one embodiment, the computing system 100 comprises a server, a laptop computer, a smartphone, a personal digital assistant, a kiosk, or a media player, for example. In one embodiment, the exemplary computing system 100 includes one or more CPUs 105, which may each include a conventional or proprietary hardware microprocessor. The computing system 100 may further include one or more memory 110, such as random access memory ("RAM") for temporary storage of information, one or more read only memory ("ROM") for permanent storage of information, and one or more mass storage device 120, such as a hard drive, diskette, solid state drive, or optical media storage device. Typically, the components of the computing system 100 are connected to the computer using a standard based bus system. In different embodiments, the standard based bus system may be implemented in Peripheral Component Interconnect ("PCP"), Microchannel, Small Computer System Interface ("SCSI"), Industrial Standard Architecture ("ISA") and Extended ISA ("EISA") architectures, cloud technology, Amazon Web Services ("AWS"), serverless computing, for example. In addition, the functionality provided for in the components and modules of computing system 100 may be combined into fewer components and modules or further separated into additional components and modules.

The computing system 100 may be generally controlled and coordinated by operating system software, such as Windows XP, Windows Vista, Windows 7, Windows 8, Windows 10, Windows Server, Unix, Linux, SunOS, Solaris, iOS, Blackberry OS, Android, or other compatible operating systems. In Macintosh systems, the operating system may be any available operating system, such as MAC OS X. In Apple phone systems, the operating system can be any available operating system, such as iOS 10. In Google phone systems, the operating system can be any available system, such as Android 7.0 "Nougat." In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 may include one or more commonly available I/O interfaces and devices 125, such as a keyboard, mouse, touchpad, and printer. In one embodiment, the I/O interfaces and devices 125 include one or more display devices, such as a monitor, that allows the visual presentation of data to a user. More particularly, a display device provides for the presentation of GUIs, application software data, and multimedia presentations, for example. The computing system 100 may also include one or more multimedia devices 160, such as speakers, video cards, graphics accelerators, and microphones, for example.

In the embodiment of the game system of FIG. 1A, the I/O interfaces and devices 125 may provide a communication interface to various external devices. In the embodiment of FIG. 1A, the computing system 100 is electronically coupled to a network 130, which comprises one or more of a LAN, WAN, and/or the Internet, for example, via a wired, wireless, or combination of wired and wireless, communication link 125. The network 130 communicates with various computing devices and/or other electronic devices via wired or wireless communication links.

In the embodiment of FIG. 1A, the server application module 115 of the computing system 100 may be stored in the mass storage device 120 as executable software codes that are executed by the CPU 105. The server application module 115 may include, by way of example, components, such as software components, object-oriented software components, class components and task components, processes, functions, attributes, procedures, subroutines, segments of program code, drivers, firmware, microcode, data, databases, data structures, tables, arrays, and/or variables.

In some embodiments, the computing system 100 stores user information in a user database in the mass storage 120 as users interact with the system via a computing device 135. The user information may include a user's demographics information. As a new user registers with the gaming system, the system may ask the user to provide personal information such as age, gender, geographic information, payment information, authentication information, etc. In some embodiments, the computing system may collect a user's geographic information when the user is interacting with the gaming system through a location determination component of the user's computing device. As the user interacts with the system, the computing system 100 may also collect the user's playing behaviors. The playing behaviors may include information about how often or how long the user plays the game in a certain amount of time. The playing behaviors may also include ways how the user reacts to different hands (e.g., how much the user bets on a certain game). The user information may further include the user's purchase information, such as the purchase history, purchase method, and the like. The user information may also include any other information associated with the user.

The server app module 115 may further include a machine learning module. The machine learning module may, based at least partly on user information of a user, determine a type of the user. The type may indicate an aggressiveness of the user, such as risk averse, risk neutral or prone to risk, or a combination. The machine learning module may then store the type in the user database. In some embodiments, the machine learning module may update the type of a user periodically based on updated information as the user interacts with the system.

The machine learning module can, based on user information, conduct a predictive analysis on a user. The predictive analysis may indicate which other games may interest the user, whether the user is a free-to-play user or a pay-to-win user. A free-to-play user is a user generally unlikely to make a purchase while a pay-to-win user is a user generally likely to purchase items when interacting with the system. For a pay-to-win user, the predictive analysis may further include personalized recommendations, such as bundles of new games that may be more enticing or useful to the user. One of the examples is the "Advisor" feature discussed in details below.

In some embodiments, the computing system 100 may be connected to a central machine learning cluster. The computing system 100 can transmit the collected data to the central machine learning cluster through multi-shard data pipelines (e.g., Amazon AWS kinesis). The machine learning cluster may include but not limited to data analysis servers, databases (MySQL, DynamoDB, MongoDB), and data warehouse (AMAZON AWS Redshift), map-reduce servers (Amazon AWS EMR [Elastic MapReduce]). The machine learning cluster can help organize and extract useful data from the data the computing system 100 collects.

In some embodiments, the computing system 100 can define data in a unified and generic manner. The computing system can store user information in a remote data store (e.g., a cloud-based data store). The computing system 100 may access the remote data store via the network 130. Other computing systems (e.g. a second game playing system) may access the same remote data store and update the remote data store.

As mentioned above, the computing device 135 may include many components similar to those of the computing system 100 so as to accomplish various functions of the game playing system. For example, the computing device 135 may include a mass storage device, a CPU, I/O interfaces and devices, memory, multimedia devices, and the user application module 140. Additionally, as with the server application module 115 described above, the user application module 140 may include computer executable software codes and/or instructions that may be executed by a CPU of the computing device 135. The user application module 135 may include functionality that, for example, provides user interfaces (for example, the user interfaces of FIGS. 2A-2F described below) through which a user may interact with the game playing system. Additionally, in an embodiment the computing device 135 comprises a mobile computing device, such as a smartphone, a tablet, a smartwatch, etc. Accordingly, the computing device 135 may include, for example, a touch-based input device, such as a touch sensitive display, and/or any of various other input and/or display devices. As described above, the computing device 135 may include a location determination component, such as a GPS component.

In the embodiment shown in FIG. 1A, the computing system 100 may be configured to execute the server application module 115, and the computing device 135 may be configured to execute the user application module 140, in order to, for example, allow a user to play various card games against a dealer or other users in accordance with the processes described below with reference to FIGS. 2A-2F, 3-5.

Figure 1B:
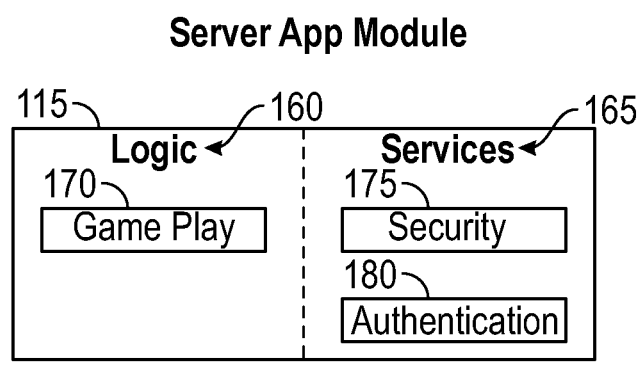
FIG. 1B is a block diagram showing an embodiment of a server application module.

FIG. 1B is a block diagram showing an embodiment of the server app module 115. The server app module may include sub-modules for logic 160 and services 165. The logic sub module 160 may include a game play component 170, which handles the logic for implementing the rules of the various disclosed card games. The services sub module 165 may include a security component 175 and an authentication component 180. The security component 175 would ensure that data transmitted to and from the computing system 100 and computing device 135 was secure. The authentication component 180 would ensure that users attempting to access the game playing system are valid.

Example Game

In a Badugi Chase poker game, the game ranks cards low to high with aces low. Hands having distinct sets of ranks and suits being superior. For sets of equal size (e.g., same number of cards), hands with lower sets of card rank superior. Specifically, a hand can consist of one to four cards of distinct rank and suit. If there are cards of same suit in a hand, higher rank cards of the same suit in a hand can be disregarded. A four-card hand can beat a three-card hand. A three-card hand can beat a two-card hand. A two-card hand can beat a one- card hand. For two hands containing the same number of cards, they can be evaluated by comparing the highest card in each hand. The hand with the lower card is superior. If there is a tie for the highest card, the second highest card, if any, is compared. If there is a tie for the second highest card, the third highest card, if any, is compared. Suits can be irrelevant in comparison of two cards. If two hands are identical in ranks, it is a tie between the two hands regardless of suits. So the best possible hand in a game can be A, 2, 3, 4 of four different suits. The worst possible hands in a game can be K, K, K, and K of four different suits.

Figures 1C, 2A, 2B:
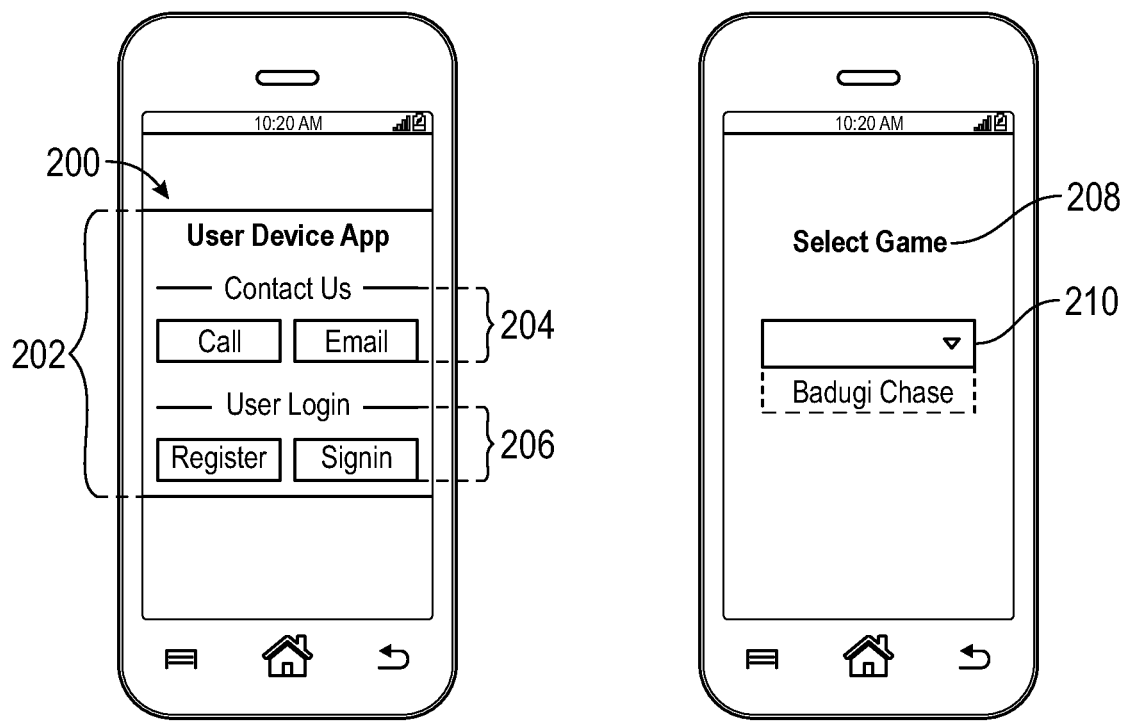
FIG. 1C is an example of database tables for a static game database and a dynamic database.
FIGS. 2A-2F show various example user interfaces of the game playing system, according to various embodiments of the present disclosure.

The computing system 100 can include a static game database. The computing system can also include a dynamic database. FIG. 1C illustrates example database tables for a static game database and a dynamic database. The computing system 100 may store a static data set in the static game database. The static data set may be a set of pregenerated game data. The static data set may include data associated with a start-id, a player-hand, community-cards (also referred to community cards), and a remaining deck. In some embodiments, the set of pregenerated game data is generated once and are not subject to change.

The start-id in the static database can be a unique identifier associated with a set of pregenerated game data. The set of pregenerated game data may include data associated with three cards for the player-hand, three cards for the community-cards, and forty six cards in the remaining deck. In one example, a single user is playing with the system. As there are fifty two cards in a deck, there may be 407,170,400 unique identifiers associated with sets of pregenerated cards. By storing the sets of pregenerated game data in the static game database, the system can advantageously improves the efficiency of the computing system 100. The computing system 100, in generating a game for a user, can randomly pick one unique identifier from the static game database. The computing system can then access the static game database and present the three player-hand cards and three community cards associated with the unique identifier to the user. Storing sets of pregenerated game data may eliminate the need for a new shuffle. The computing system 100 may also record the pick unique identifier in the mass storage 120 (e.g., in the dynamic database). The machine learning module or the machine learning cluster may use data associated with the picked unique identifier to conduct further analysis on the user.

The user may pick a player-choice in a game. The user can also place a bet as he makes his pick. The player-choice may be one of the three cards in the community-cards associated with the unique identifiers. The computing system 100 can then randomly pick three cards for dealer-hand from cards in the deck. Based on the best Badugi hand among the three cards for the player-hand combined with the picked player-choice compared to the best badugi hand among the three cards for dealer combined with the remaining 2 non-picked cards from the community cards, the computing system can determine a winner of the game. As the user makes his pick in a game, the computing system 100 can store data associated with a game-ID, a start-ID associated with the static database, a player-choice, and a dealer-hand in the dynamic database. In some embodiments, the computing system 100 may store other information in the dynamic database, such as a bet from the user, a result of the game, etc.

In the example above, the user is playing with the system. In some embodiments, when the user is playing with other users, the computing system 100 may store sets of pregenerated cards in a multi-user static game database. For example, if two users are playing with the system, the static game database may store data associated with a start-id, three cards for a player-one-hand, three cards for a player-two-hand, three cards for community-cards and forty three cards in the deck. Accordingly, as the two users each picks a card from the three community cards, the system may store data associated with a game-ID, a start-ID, a card of playerone-choice from the three community cards, a card of player-two-choice from the three community cards, and three cards for dealer hands in the dynamic database.

In one embodiment, after the user has selected an initial bet, the server can randomly select a batch of multiple (e.g., ten) sets pregenerated game data from the static database. In one embodiment, the server can also generate a dynamic portion of the hand. For example, the server can generate a static portion of a hand, such as a user's three cards and three cards while dynamic portion of the hand can be the server's three cards. The server can then return a batch of sets of pregenerated of game data to the user through a request queue to the API gateway. In one embodiment, the user can view the first set of pregenerated of game data on the application. The user can also choose to how to play the hand. After the server records the user's choices, it can transmit a gaming result (e.g. a winner) back to the user. The user can repeat for a second game in the batch of the game returned. The play can repeat such process until all games are depleted in the batch. The play can make request for another batch of sets of pregenerated game data.

As an example of a game design, the user can begin by making a 1-unit Ante Bet. As the system presents the user with a first set of pregenerated game data, the user can choose to either make a Raise bet of twice of the Ante Bet, or make a Raise bet of three times of the Ante bet. In one example, the Raise bet is settled at even money. In other examples, the raising amount can be variable. The Ante bet pushes if the user hand beats or ties the dealer hand, and is lost if the user hand loses to the dealer hand. However, a user who has a 4-card Badugi that is low enough can receive an "Ante Bonus" payout on their Ante bet, regardless of whether or not the user hand beats the dealer hand, according to the following pay table:

9 high: 1×
8 high: 2×
7 high: 3×
6 high: 5×
5 high: 10×
4 high: 25×

In the example, a program is written which simulates 200,000 random 6-card deals (3 user cards and 3 community cards). For each of these deals, the optimal card for the user to select is calculated by going through the 15,180 possibilities for the three dealer cards in both the "raise twice of" and "raise three times of" scenarios, for a total of 3.036 billion simulated games. For each possible 3-card user hand (combining data for equivalent hands that differed only by a suit permutation), the optimal decision for the raise amount is calculated. This involves raising 3× on 13,872 of the 22,100 possible 3-card hands, for an average total wager of 3.6277 Ante units. The House Edge is estimated to be 11.84% of an Ante unit before the Ante Bonus payouts, and 4.43% of an Ante unit after the Ante Bonus payouts, which is an average of 1.22% of the total amount wagered. There is a Bonus payout 3.01% of the time, or 1 out of 33.2 hands.

Example User Interfaces

FIGS. 2A-2F show example user interfaces of the game playing system, according to various embodiments of the present disclosure. Each of the example user interfaces shown in FIGS. 2A-2F may be provided to a user using the game playing system via a computing device (such as the computing device 135). The various example user interfaces may, for example, be generated and/or provided by the user application module 140, and may be displayed on a display of, for example, a smartphone. Further, inputs may be received, for example, via a touch-sensitive display of a smartphone. In another example, the user interfaces of the FIGS. 2A-2F may be generated by the server application module 115, and may be transmitted to the computing device 135 where they may be displayed to the user. As further described below, through the various user interfaces the user may provide information to, and may receive information from, the game playing system. For example, information provided by the user may be transmitted to and/or processed by various components of the computing device 135 and/or computing system 100. In various embodiments, more or fewer elements may be displayed in the user interfaces described below, and or the various elements may be arranged differently and/or have a different appearance. The user can make a request to the server to start playing a game, such as Badugi Chase. The user can make the request through an API gateway. The gateway can invoke serverless lambda microservice which communicates with the server through a request queue.

FIG. 2A shows an example user interface 200 of the game playing system in which a user may register to use the system. As with various other example user interfaces described below, the user interface 200 of FIG. 2A may be shown on a display 202 of a mobile computing device (in this example, a smartphone). Also, as with various other example user interfaces described below, the user interface 200 of FIG. 2A may be associated with a user software application that may be generated by the user application module 135 and/or server app module 115, as described above.

Through the user interface 200 the user may select to contact entities associated with the game playing system by calling or emailing (as indicated at 204). Also, as indicated at 206, the user may select to register (for example, to create an account with the game playing system) or sign in/log in (when, for example, the user already has an account) to use the user application.

FIG. 2B shows an example user interface associated with the game playing application in which the user is presented with various options to interact with the game playing system. A text field 208 may tell the user the name of the card game.

Through the example user interface of FIG. 2B, for example, the user may see Badugi Chase is available and the user may then click on Badugi Chase to start the game.

Figure 2C:
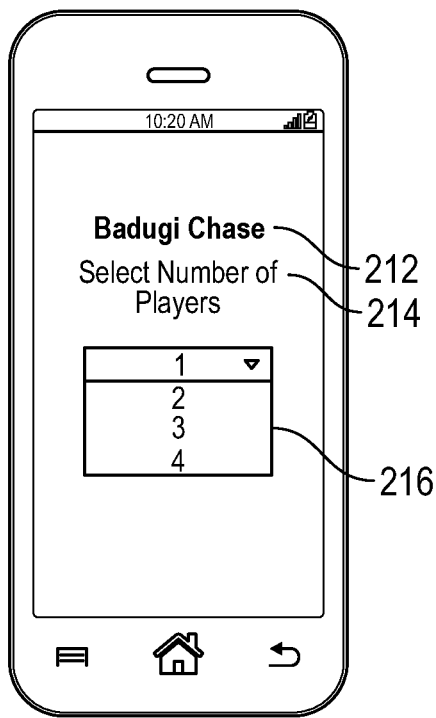

FIG. 2C shows an example user interface associated with the game playing application in which the user is presented with the ability to make a user action for the game selected. A text field 212 may state Badugi Chase is being played. For example, the text field would state Badugi Chase if that was the game being played. Another text field 214 may indicate that the user can select the number of users. A dropdown menu 216 may be provided which allows the user to choose the number of users in the game from a finite list. For example, the dropdown menu may allow the user to select between 1 and 4 users, which in no way limits the number of users that can play a card game according to the disclosed invention.

Through the example user interface of FIG. 2C, for example, to select the number of users, from single user to multiple users, the user may click on the dropdown menu and then select the number of users. For example, the user may wish to play a single user game. The user would then click on 1 to select it.

Figure 2D:
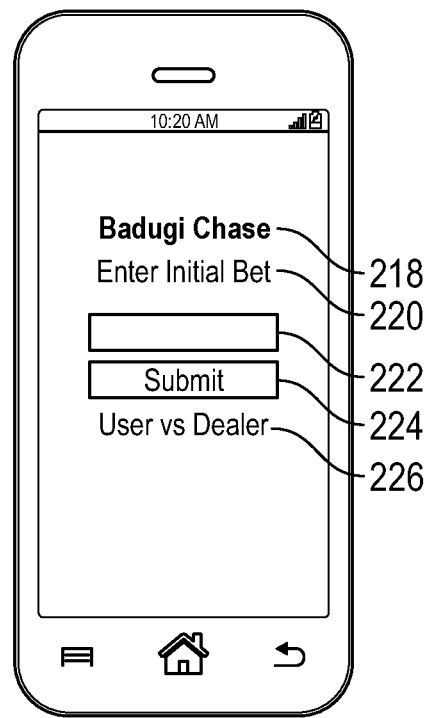

FIG. 2D shows an example user interface associated with the game playing application in which the user is shown the results of a user action and may make a further user action for the game selected. A text field 218 may state the user is playing Badugi Chase. Another text field 220 may indicate that the user can enter an initial bet. An editable text field 222 may be provided to allow the user to enter in the value of the initial bet. A submit button 224 may be provided to allow the user to submit the initial bet.

Through the example user interface of FIG. 2D, for example, the user may place an initial bet by typing a value in the Enter Initial Bet editable field 222 and then clicking the submit button 224. For example, the user may wish to place an initial bet of $100. The user would enter $100 in the Enter Initial Bet editable field 222 and then click on the submit button 224.

In one embodiment, the system can include a card organizer feature. Once the system returns a set of hand to a user, the system can organize the cards automatically. The system can first organize the cards by numbers, K being the highest ranked number while A being the lowest ranked number. The system can then organize the cards with the same numbers by suits in a ranked order of spades, hearts, diamonds and clubs with spades being the highest ranked suit and clubs being the lowest ranked suit. The system can then display the user's hand in an organized way from the lowest ranked card to the ranked highest card or from the lowest ranked card to the highest ranked card. In one embodiment, the system can first organize the suits of the cards and then the numbers of the cards. In some embodiments, the system can give the user an option to choose how the user wants to organize the cards.

Figures 1, 2E:
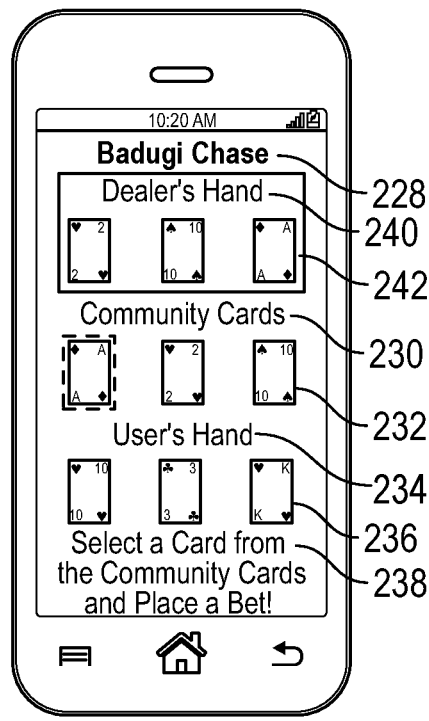

FIG. 2E-1 shows an example user interface associated with the game playing application in which the user is shown game data resulting from the user's action. A text field 228 would state Badugi Chase if that was the game selected. Another text field 230 may indicate part of the game data resulting from a user action by stating that certain cards are community cards (also referred to "community cards"). Part of the game data may be displayed in 232. For example, a set of cards may be displayed under the community cards label to show the user which cards are community cards. For example, the community cards may be the Ace of Diamonds, 2 of Hearts, and 10 of Spades. Another text field 234 may indicate that more game data will be displayed by indicating that three cards belong to the user. The text field 234 may state "User's hand", for example. More game data may be displayed in 236. For example, a set of cards 236 may be displayed under the text field 234 to show the user which cards belong to the user. The set of three cards may consist of, for example, the 10 of Hearts, 3 of clubs, and K of Hearts. Another text field 240 may indicate that more game data will be displayed by indicating that three cards belong to the dealer. The text field 240 may state "Dealer's Hand", for example. More game data may be displayed in 242 to show the dealer has three unfolded cards. A text field 238 may be provided to indicate instructions for the user to follow to continue game play. For example, the text field 238 may state "Place a bet and then select a card from the three community cards."

Through the example user interface of FIG. 2E-1, for example, the user may select a card from the set of three community cards by clicking the card, touching it, or selecting it with a stylus, among various other ways. For example, the user may wish to select the A of Diamonds, 2 of Hearts or 10 of Spades. The user would then perform the appropriate action to select the Ace of Diamonds by either clicking on it, touching it, or selecting it with a stylus, among various other ways of selecting an item on a screen. The A of Diamonds goes to the user while the 2 of Hearts and 10 of Spades goes to the dealer.

Figures 2, 2E:
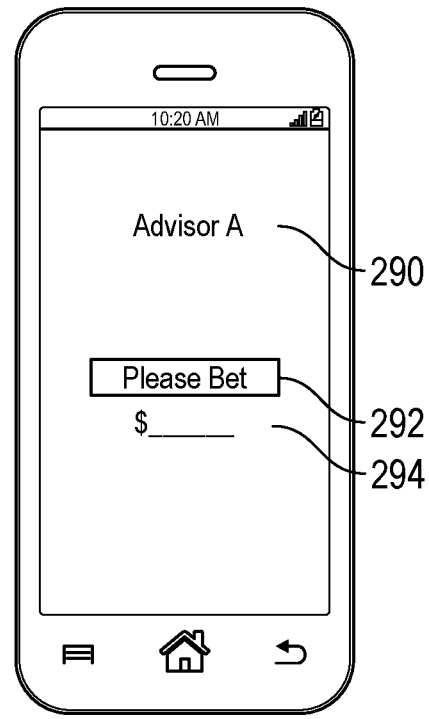

FIG. 2E-2 shows an example user interface associated with the game playing application in which the user. In this example, the user is a premium user. The user may has an advisor "advisor A" 290. As the user selects a card from the three community cards, the system can pop a user interface as shown in FIG. 2E-2 to the user. The system can indicate that the user has paid for an advisor "advisor A" to help them in placing bets. The Advisor A 290 may indicate how much the user should bet on the game in a bet field 294.

In some embodiments, to determine an advisor for a premium user, the system can store user information in the user database. The user database can include data associated with user validation information. The user database can further include user playing information. The user playing information can include how the user plays his/her hand in each game, how much the user bets in each game, how the user reacts to losing one game, how the user reacts to winning a game and the like. The system can instruct the server to store the playing information in the user database.

The system can then compute the user's playing data from the user database to determine what type of user the payer is. The types of users can be risk averse, risk neutral or prone to risk, or a combination. The types of user can also be a new user, an experienced user and the like. This is not an exhaustive list.

In some embodiments, the system can determine an aggressiveness level of a user based on: a betting preference and a community card suit selection preference. The betting preference can indicate how much risk a user is taking when he places a bet. The system can define thresholds of risk averse, risk neutral or prone to risk type user. Based on the defined thresholds, the system can determine what type of user a user is. In one example, the system can define a risk neutral as a user who raises three times of the bet when the user has a three card badugi, raises twice of the bet when the user has a two card badugi, places a minimum bet when the user has a two card badugi. The community card suit selection preference can indicate a preferred pick when the user is given four equal picks to improve his hand equally. For example, if there are a 2 of Diamond and a 2 of Spade in the community card and picking either one of them can improve the user's hand equally and the user prefers to pick the 2 of Spade, the community card suit selection preference for the user is Spade. The system can list a user's full suit preference. For example, one user's full suit preference can be: Heart, Spade, Diamond, and Club, which means he prefers Heart to Spade, Spade to Diamond, and Diamond to Club. As another example, another user's full suit preference can be: Heart, which means he prefers Heart to other suits and no preference among Spade, Diamond and Club.

In some embodiments, the system can determine an aggression level by calculating a betting preference. As an example, the system can set a baseline score for a reasonable risk neutral user. The baseline score can be 1. For each game a user plays, the betting preference will affect the user's aggression level. If the user has a three card badugi and raises three times of the bet, or if the user has a two card badugi and raises twice of the bet, or if the use has a one card badugi and places a minimum bet, his score remains the same. On the other hand, if the user has a three card badugi and raises twice of the bet, his new score equates is his old score multiplying $(1-(1/101))$. If the user has a three card badugi and places a minimum bet, his new score equates is his old score multiplying $(1-(3/101))$. If the user has a two card badugi and raises three times of the bet, his new score equates is his old score multiplying (1+(1/101)). If the user has a two card badugi and raises a minimum bet, his new score equates is his old score multiplying (1-(1/101)). If the user has a one card badugi and raises three times of the bet, his new score equates is his old score multiplying (1+(3/101)). If the user has a one card badugi and raises three times of the bet, his new score equates is his old score multiplying (1+(1/101)). In this example, the user's score is calculated each time he plays a game. The user's score can be his aggression level.

Based on the user's full suit preference and aggression level, the system can recommend an advisor to the user. In some embodiments, the system can recommend an advisor who mimics a user's playing behavior to the user. The system can also recommend an advisor that can gradually change the user's playing behavior to the user. The system can have multiple advisors with different range of aggression levels or suit preferences.

As an example, the system can have twelve different advisors. Each advisor can have different characteristics and is targeted for users with different range of aggression levels or suit preferences. In this example, the system has the following advisors: Rat(intelligent, adaptable, quick-witted, charming, artistic, sociable), Ox(Loyal, reliable, thorough, strong, reasonable, steady, determined), Tiger(Enthusiastic, courageous, ambitious, leadership, confidence, charismatic), Rabbit(Trustworthy, empathic, modest, diplomatic, sincere, sociable, caretakers, sensitive), Dragon(Lucky, flexible, eccentric, imaginative, artistic, spiritual, charismatic), Snake (Philosophical, organized, intelligent, intuitive, elegant, attentive, decisive), Horse(Adaptable, loyal, courageous, ambitious, intelligent, adventurous, strong), Goat (Tasteful, crafty, warm, elegant, charming, intuitive, sensitive, calm), Monkey(Quick-witted, charming, lucky, adaptable, bright, versatile, lively, smart), Rooster(Honest, energetic, intelligent, flamboyant), Dog(Loyal, sociable, courageous, diligent, steady, lively, adaptable, smart), and Pig (Honorable, philanthropic, determined, optimistic, sincere, sociable). Each advisor can recommend the user how to place a bet based on their characteristics. The system can first assign one of the twelve advisors to the user based on the user's aggression level range. For example, the system can recommend Rat to a user with an aggression level of 0.85 or full suit preference of Diamond, Spade, Heart and Club. As another example, the system can recommend Ox to a user with an aggression level of 0.95 or full suit preference of Club, Spade, Heart, then Diamond.

As the server makes a determination what type or types of user a user is, the system can recommend one or more advisors to the user. To access the advisor feature, the system can ask the user to pay a certain amount of fees to get a premium access to the system. Once the user pays the fees, the system can mark the user as a premium user. For a premium user, the system can provide the user with one or more advisors. The one or more advisors are determined by the user's type. If the system recommends more than one advisors, the user can choose one of them. The user can then play the game on the recommendation of the chosen advisor. In one embodiment, if the user is not satisfied with the chosen advisor's performance, the user can then return the advisor back to the system and select another advisor. In one embodiment, the system can record how the user interacts with advisors. The system can also record the user's performance after the help of an advisor. The system can also record a user's performance with the help of different advisors. The system can store all relevant data into the user database. The system can then recalculate to determine what type or types of user a user becomes after the help of the advisor in order to recommend more suitable advisors later.

Figures 2, 2E, 3:
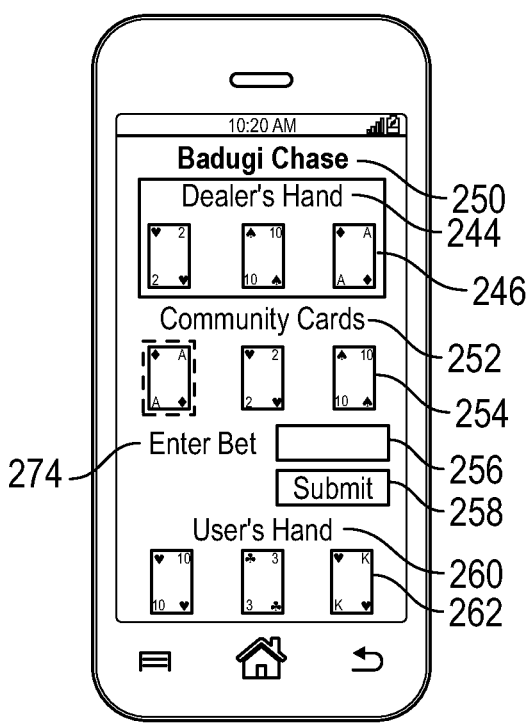
FIG. 3 is a flowchart illustrating an example operation of the game playing system with a single user, according to an embodiment of the present disclosure.

FIG. 2E-3 shows an example user interface associated with the game playing application in which the user is allowed to make a further user action. FIG. 2E-3 has the same elements as FIG. 2E-1 with some additional fields. A text field 274 may indicate that the user can place a bet. The editable text field 256 may allow the user to enter the value of the bet. A submit button 258 may allow the user to submit the selected card and the value of the bet.

Through the example user interface of FIG. 2E-1, after selecting a card from the set of community cards, for example, the user may type the value of the bet in the editable text field 256. The user may then submit the selected card and value of the bet by clicking on the submit button 258.

Figure 2F:
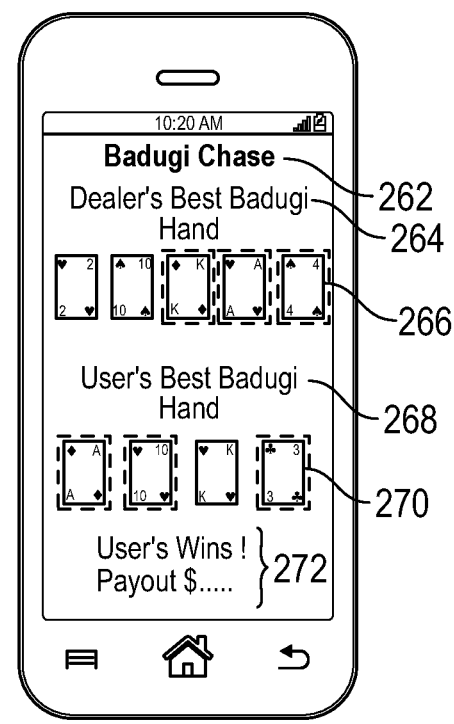
Figure 3:
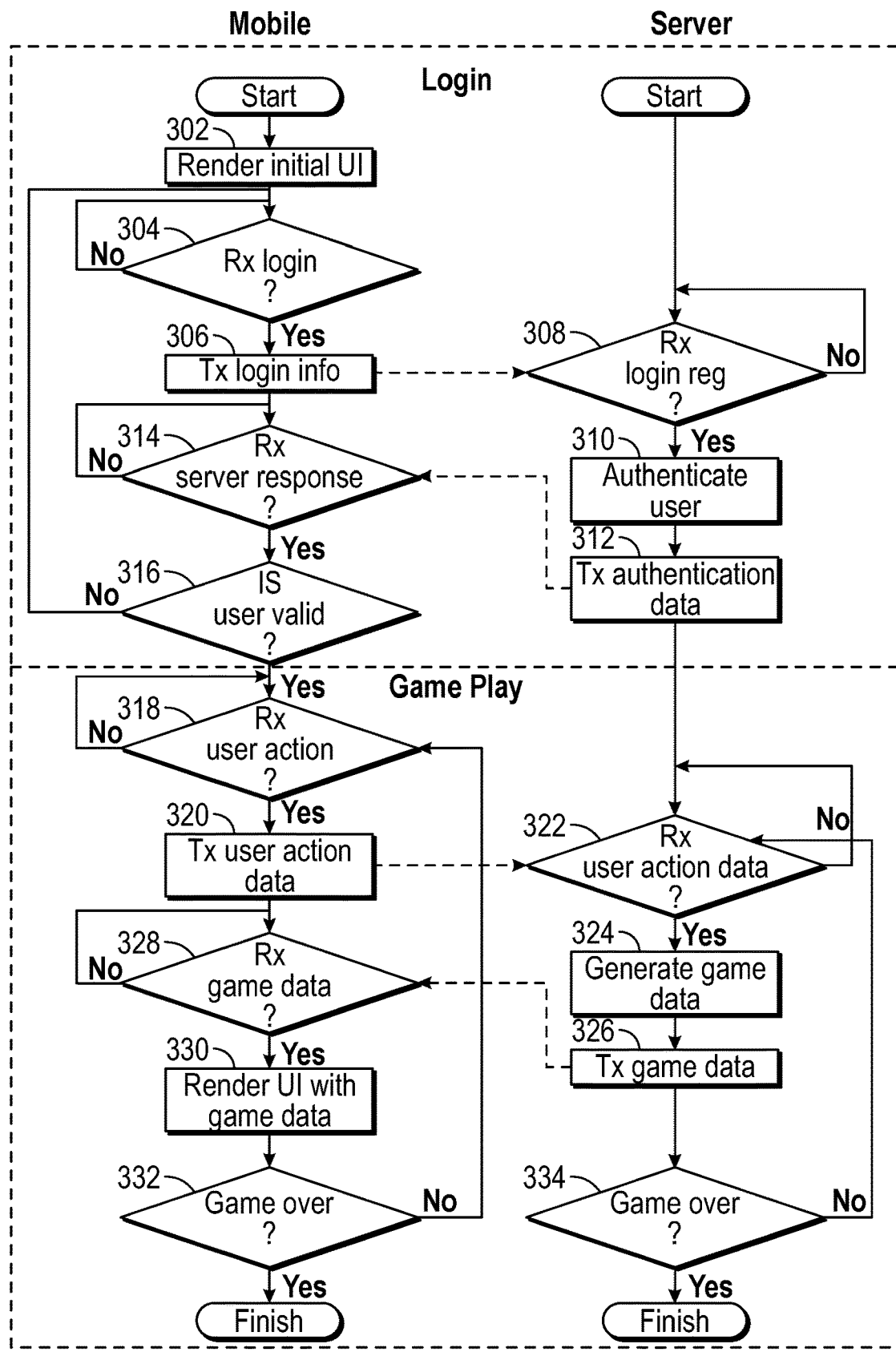

FIG. 2F shows an example user interface associated with the game playing application in which the user is shown game data resulting from a user action. A text field 262 may state Badugi Chase is being played. Another text field 264 may indicate that the dealer's best hand will be displayed. A set of cards 266 may be displayed under the text field 264 to show the user what the dealer's best Badugi hand is according to the rules of Badugi Chase described below. Another text field 268 may indicate that the user's best Badugi hand will be displayed. A set of cards may be displayed under 268 to display the user's best hand according to the rules of Badugi described below. 272 may show a text field that shows who the winner of the game is and a text field that may indicate what the payout is.

Through the example user interface of FIG. 2F, the user may be shown in 266 that the dealer's best Badugi hand is, for example, the K of Diamonds, A of Hearts, and 4 of Clubs. In 270, the user may be shown, for example, that the user's best Badugi hand is the A of diamonds, 10 of hearts, and 3 of clubs. In 272, the user may be shown that the user is the winner and that the payout is $500.

Example Operations

FIG. 3 is a flowchart illustrating an example operation of the game playing system, according to an embodiment of the present disclosure. The flowchart of FIG. 3 illustrates an example method of allowing a user to play a single user game. Part of the example method may be stored as a process accessible by, or part of, the server app module 115 and/or other components of the computing system 100. Another part of the example method may be stored as a process accessible by, or part of, the user app module 140. The example method in FIG. 3 shows two distinct but related processes, one occurring on the client side, called the client side process, and the other occurring on the server side, called the server side process. Depending on the embodiment, certain of the blocks described below may be removed, others may be added, and the sequence of the blocks may be altered. In one embodiment, after the user has selected an initial bet, the server randomly selects a batch of 10 pregenerated starting hands from a static cache of pregenerated games. The static cache can be populated from a database. The database can store or persist the static pregenerated starting hands. In one embodiment, the server can also generate a dynamic portion of the hand. For example, the server can generate a static portion of a hand, such as a user's two cards and three community cards while dynamic portion of the hand can be the server's three hole cards. The server can then return a batch of starting hands to the user through a request queue to lambda to the API gateway. In one embodiment, the user can view the first starting hand on the application. The user can also choose to how to play the hand. After the server records the user's choices, it can transmit a gaming result back to the user. The user can repeat for a second game in the batch of the game returned. The play can repeat such process until all games are depleted in the batch. The play can make request for another batch of 10 games.

In explaining the operation of the flowchart in FIG. 3, the following assumes that a user will make two user actions before the game is completed. This is for illustrative purposes only, and in no way limits any game operation disclosed to only two user actions. The example method begins on the client side. The client side process begins at block 302 after the user starts the user app module 140 on a computing device 135. The computing device 135 renders an initial UI, as illustrated in FIG. 2a. The client side process moves to block 304, a decision block that asks whether the user app module has received login information. If it has not, the client side process loops back to block 304. If it has, the client side process moves to block 306.

After the user logs in, the client side process moves to block 306, where the user app module sends the login information to the network 130. The network 130 then transmits the login information to the computing system 100. The client side process then moves to block 314, a decision block that asks whether the user app module has received a server response. If it has, the client side process moves to block 316. If it has not, the client side process loops back to block 314. At this point in the example, the user app module has not yet received a server response, so the client side process remains at block 314.

On the server side, the server side process begins at block 308, a decision block that asks whether the server app module has received the login information from the computing system 100. If it has not, the server side process loops back to block 308. If it has, the server process moves to block 310.

When the server app module receives the login information, the server side process moves to block 310, where the server app module authenticates the user, generating authentication data. The server process then moves to block 312, where the server app module sends the authentication data to the network 130. The network 130 then transmits the authentication data to the computing device 135. The server side process then moves to block 322, a decision block that asks whether the server app module has received user action data. If it has not, the server side process loops back to block 322. If it has, then the server side process moves to block 324. At this point in this example, the server app module has not yet received user action data, so the server side process remains at block 322.

On the mobile side, at this point in the example, the user app module receives the authentication data, so the client side process moves to block 316, where the user app module processes the authentication data. Block 316 is a decision block which asks whether the user is valid. If the user is not valid, the process loops back to block 304, where the user is allowed to enter login information again. If the user is valid, the client side process moves to block 318.

In this example, assume the user is valid. Then, the client side process moves to block 318, a decision block that asks whether user app module has received a user action. If it has not, the client side process loops back to block 318. If it has, the client side process moves to block 320. Assume the user makes a first user action, which generates the first user action data. When the user app module receives this first user action data, the client side process moves to block 320. In block 320, the user app module sends the first user action data to the network 130. The network 130 then transmits the first user action data to the computing system 100. The client side process then moves to block 328, a decision block that asks whether the user app module has received game data. If it has not, the client side process loops back to block 328. If it has, then the client side process moves to block 330. At this point in this example, the user app module has not yet received the first game data, so the client side process remains at block 328.

On the server side, at this point in the example, the server app module receives the first user action data. The server side process then moves to block 324, where the server app module generates first game data necessary for a one user game. In block 326, the server app module transmits the first game data to the network 130, which then transmits the game data to the mobile device. The server side process then moves to block 334, a decision block that asks whether the game is over. If it is, then the server side process is finished. If it is not, then the server side process loops back to block 322.

At this point in the example, the game is not over, since the user has not had a chance to make two user actions yet. Thus, the server side process goes back to block 322, a decision block that asks whether the server app module has received user action data, as illustrated in FIG. 3. At this point in the example, the server app module has not received the second user action data yet, so the server side process remains at block 322.

On the mobile side, at this point in the example, the user app module receives the first game data, so the client side process moves to block 330. In block 330, the user app module renders the UI with the first game data. The client side process then moves to block 332, a decision block where it asks whether the game is over. If it is, the client side process is finished. If it is not, the client side process moves to block 318.

At this point in the example, the game is not over, since the user has not had a chance to make two user actions yet. Thus, the client side process moves to block 318, a decision block that asks whether the server app module has received user action data, as illustrated in FIG. 3. At this point in the example, assume that the user makes a second user action, generating a second piece of user data. The client side process then moves to block 320, where the user app module sends the second piece of user action data to the network 130. The network 130 then transmits the second piece of user action data to the computing system 100. The client side process then moves to block 328, a decision block that asks whether the user app module has received game data. If it has not, the client side process loops back to block 328. If it has, then the client side process moves to block 330. At this point in this example, the user app module has not yet received game data, so the client side process remains at block 328.

On the server side, at this point in the example, the server app module receives the second piece of user action data. The server side process then moves to block 324, where the server app module generates second game data. The server side process then moves to block 326, where the server app module transmits the second game data to the network 130, which then transmits the second game data to the mobile device. The server side process then moves to block 334. Since the user has had a chance to make two user actions, the game is over, and the server side process is finished.

On the mobile side, at this point in the example, the user app module receives the second game data, so the client side process moves to block 330. In block 330, the user app module renders the UI with the second game data. The client side process then moves to block 332. Since the user has had a chance to make two user actions, the game is over, and the client side process is finished.

Figure 4:
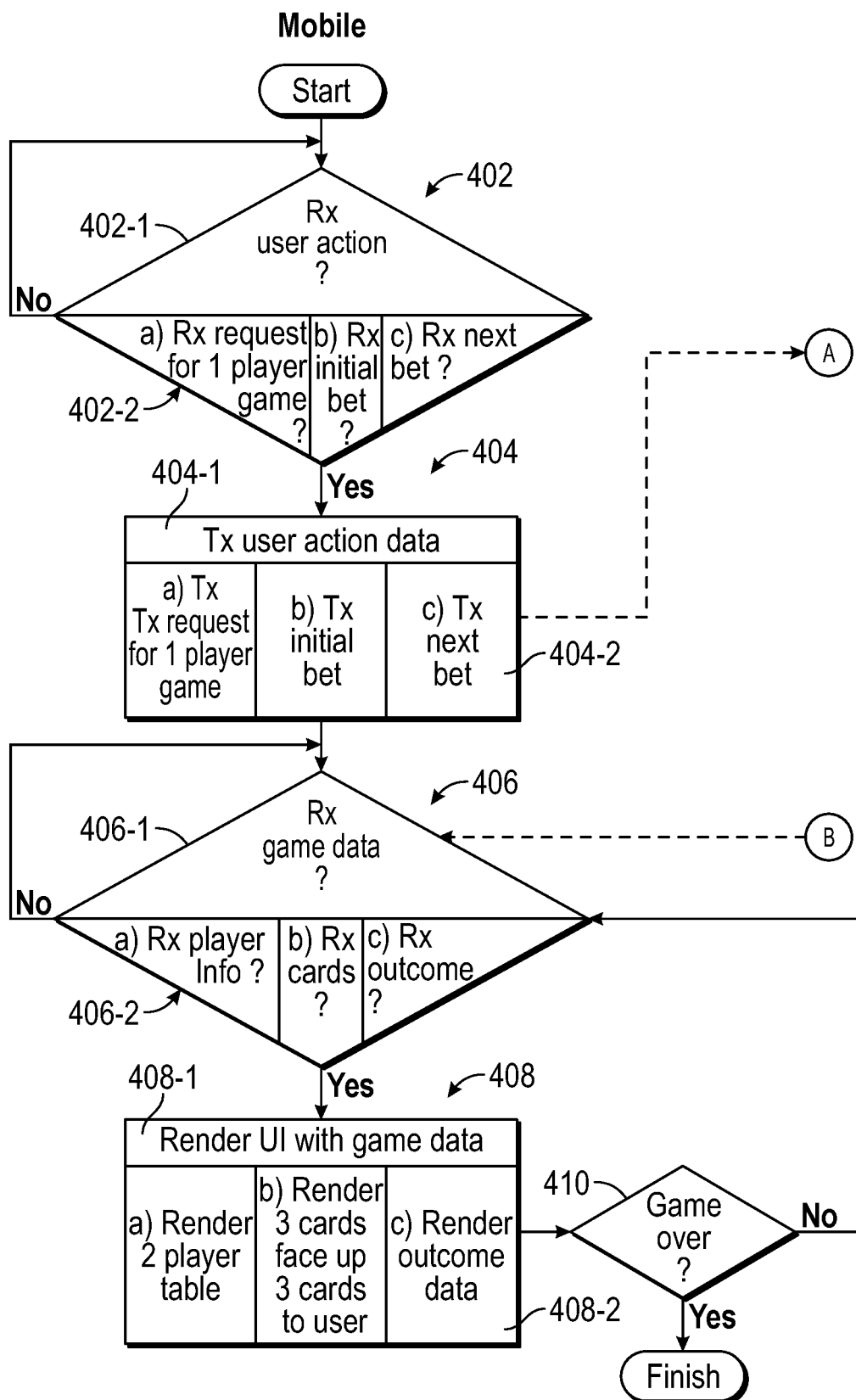
FIG. 4 is a flowchart illustrating an example operation of the game playing system with a single user, incorporating the rules of an invented card game, according to an embodiment of the present disclosure.
Figure 4:
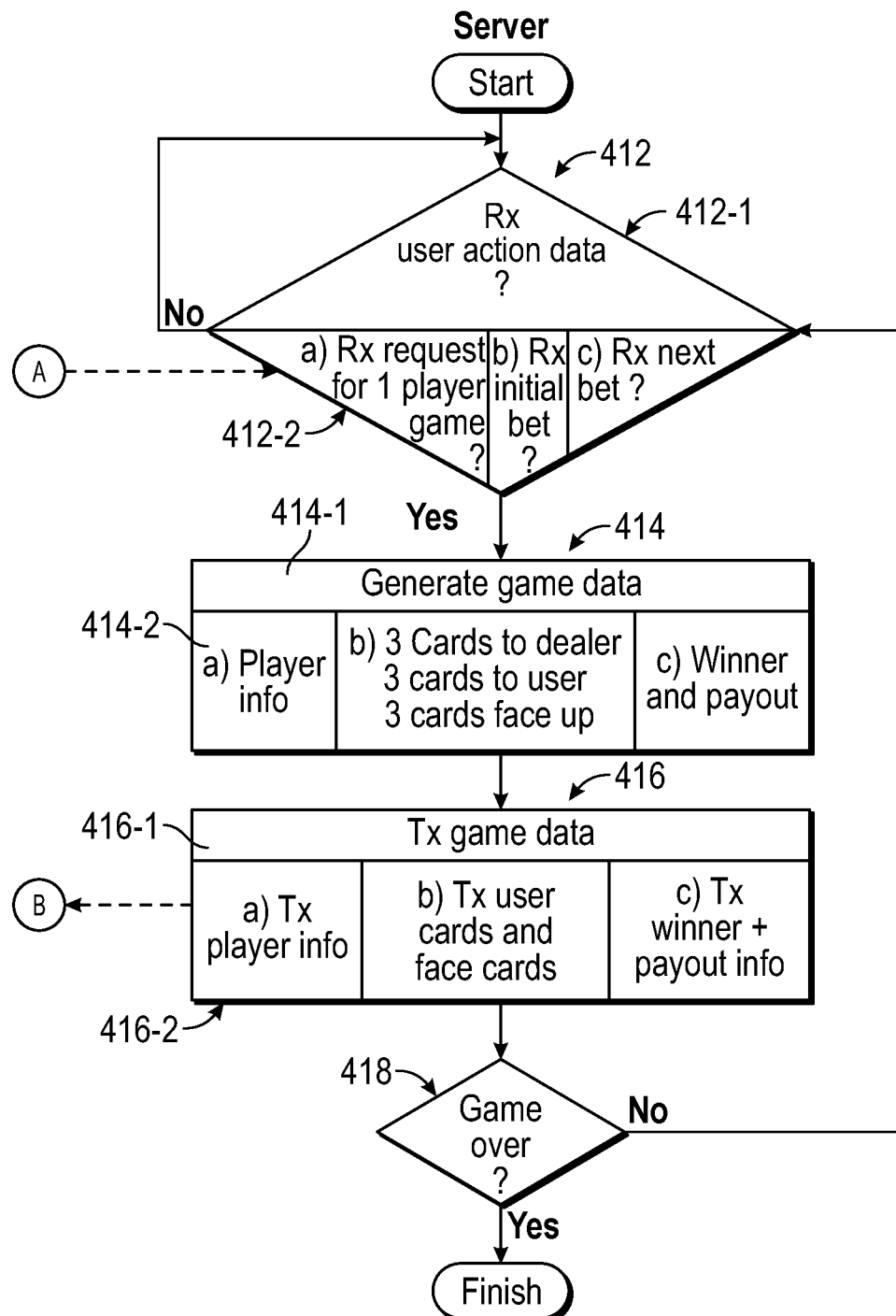

FIG. 4 is a flowchart illustrating an example operation of the game playing system, according to an embodiment of the present disclosure. The flowchart of FIG. 4 illustrates a method of implementing the game play portion of FIG. 3 with the specific rules of the invented card game Badugi Chase for a single user game. The method includes operations on a client side, called the client side process, and operations on a server side, called the server side process.

On the client side, the client side process begins with block 402, which corresponds to block 318 in FIG. 3. Block 402 is a decision block, and sub block 402-1 asks whether the user app module has received a user action. According to one set of rules of Badugi Chase, the first user action is the user requesting the number of users in the game, as illustrated in sub block 402-2a. If the user app module has received the user request for number of users, the client side process moves to block 404. If it has not, it loops back to block 402.

Assume that the user requests a one user game through the UI, generating first user action data, as illustrated by FIG. 2c. The client side process then moves to block 404, which corresponds to block 320 in FIG. 3. In sub block 404-2a, the user app module sends the first user action, which is the user's request for a single user game, to the network 130. The network 130 transmits the first user action to the computing system 100. The client side process then moves to block 406, which corresponds to block 328 in FIG. 3. Sub block 406-1 is a decision block which asks whether the user app module has received game data yet. More specifically, at this point in the example, sub block 406-2a asks whether the user app module has received the user information. If it has, the client side process moves to block 408. If it has not, the client side process remains at block 406. At this point, the user app module has not yet received the first game data, so the client side process remains at block 406.

On the server side, the server side process begins at block 412, which corresponds to block 322 in FIG. 3. Sub block 412-1 is a decision block which asks whether the server app module has received user action data. More specifically, sub block 412-2a asks whether the server app module has received the user's request to play a single user game. If it has, the server side process moves to block 414. If it has not, the server side process remains at block 412.

Assume that the server app module receives the first user action data, which is the user's request to play a single user game. Then, the server side process moves to block 414, which corresponds to block 324 in FIG. 3. In sub block 414-1, the server app module generates a first set of game data. According to one set of rules of Badugi Chase, the first set of game data generated is information regarding the users of the game. Specifically, in block 414-2a, the server app module generates the information that the two users are the user and the dealer, which is the server in this case. This example in no way limits the kind of data that the computing system can generate in block 414-2a. The server side process then moves to block 416, which corresponds to block 326 in FIG. 3.2. In block 416-1, the server app module sends the first set of game data, which in block 416-1a is the user information, to the network 130, which transmits the game data to the computing device 135.

The server side process then moves to block 418, which corresponds to block 334 in FIG. 3. Block 418 is a decision block which asks whether the game is over. If it is, the server side process is finished. If it is not, the server side process moves back to block 412. According to one set of rules of Badugi Chase, the game is not over yet, so the server side process moves to block 412. Sub block 412-2b asks whether the server app module has received a second user action, which, according to one set of rules of Badugi Chase, is a user's initial bet. At this point in this example, the server app module has not received the user's initial bet, so the server side process remains at block 412.

On the client side, at this point in the example, the user app module receives the first game data, which is the user information. The client side process then moves to block 408, which corresponds to block 330 in FIG. 3. In sub block 408-1, the user app module renders the UI with the first set of game data. In the context of the rules of Badugi Chase, sub block 408-2a renders the UI with the initial user information, one example of which is shown in FIG. 2d. The client side process then moves to block 410, which corresponds to block 332 in FIG. 3. Block 410 is a decision block which asks whether the game is over. If it is, the client side process is finished. If it is not, the client side process moves back to block 402.

According to one set of rules of Badugi Chase, the game is not over yet, so the client side process moves back to block 402. As illustrated in FIG. 2d, the user can make a second user action, which is an initial bet. After the user makes the second user action, the client side process then moves to block 404. In sub block 404-2b, the user app module sends the second user action, which is the user's initial bet, to the network 130. The network 130 transmits the second user action to the computing system 100. The client side process then moves to block 406. At this point in the example, sub block 406-2b asks whether the user app module has received the second set of game data, which are the cards. At this point, the user app module has not yet received the second set of game data, so the client side process remains at block 406.

Assume that the server app module now receives the second user action data, which is the user's initial bet. Then, the server side process moves to block 414. In sub block 414-1, the server app module generates a second set of game data. According to one set of rules of Badugi Chase, the second set of game data generated is the card information. Specifically, in block 414-2b, the server app module deals the three cards to itself, three cards to the user, and three cards face up, which comprise the second set of game data. This example in no way limits the kind of data that the computing system can generate in block 414-2b. The server side process then moves to block 416. In block sub block 416-1, the server app module sends the second set of game data, which in block 416-2b is the card information, to the network 130, which transmits the game data to the computing device 135.

The server side process then moves to block 418. According to one set of rules of Badugi Chase, the game is not over yet, so the server side process moves to block 412. At this point in this example, the server app module has not received the user's second bet, so the server side process remains at block 412.

On the client side, assume that the user app module now receives the second set of game data, which is the card information. The client side process then moves to block 408. In sub block 408-1, the user app module renders the UI with the second set of game data. In the context of the rules of Badugi Chase, sub block 408-2*b* renders the UI with the card information, one example of which is shown in FIG. 2E-1.

The client side process then moves to block 410. According to one set of rules of Badugi Chase, the game is not over yet, so the client side process moves back to block 402. According to one set of rules of Badugi Chase, the user may now place an additional wager by selecting one of the face up cards to add to his or her hand. The remaining two face up cards become part of the dealer's hand. As illustrated in FIG. 2E-1 and 2E-2, which illustrates one implementation of this, the user can select a card, and then enter in a value for a second wager. After the user app module receives the third user action, the client side process then moves to block 404. In block 404-2C, the user app module sends the third user action, which is the user's selected card and second wager, to the network 130. The network 130 transmits the third user action to the computing system 100. The client side process then moves to block 406. At this point in the example, sub block 406-2C asks whether the user app module has received the third set of game data, which is the outcome. At this point, the user app module has not yet received the third set of game data, so the client side process remains at block 406.

Assume that the server app module now receives the third user action data, which is the user's selected card and additional wager. Then, the server side process moves to block 414. In sub block 414-1, the server app module generates a third set of game data, which, according to sub block 414-3C, is the winner and payout information. According to one set of rules of Badugi Chase, the winner and payout information are calculated. This example in no way limits the kind of data that the computing system can generate in block 414-2*c*. The server side process then moves to block 416. In sub block 416-1, the server app module sends the third set of game data, which in block 416-2*c* is the winner and payout information, to the network 130, which transmits the third set of game data to the computing device 135.

The server side process then moves to block 418. According to one set of rules of Badugi Chase, the game is now over, so the server side process is finished.

On the client side, assume that the user app module now receives the third set of game data, which is the outcome and payout information. The client side process then moves to block 408. In sub block 408-1, the user app module renders the UI with the third set of game data. In the context of the rules of Badugi Chase, sub block 408-2*c* renders the UI with the outcome and payout information, one example of which is shown in FIG. 2*f*. The client side process then moves to block 410. According to one set of rules of Badugi Chase, the game is now over yet, so the client side process is finished.

Figure 5:
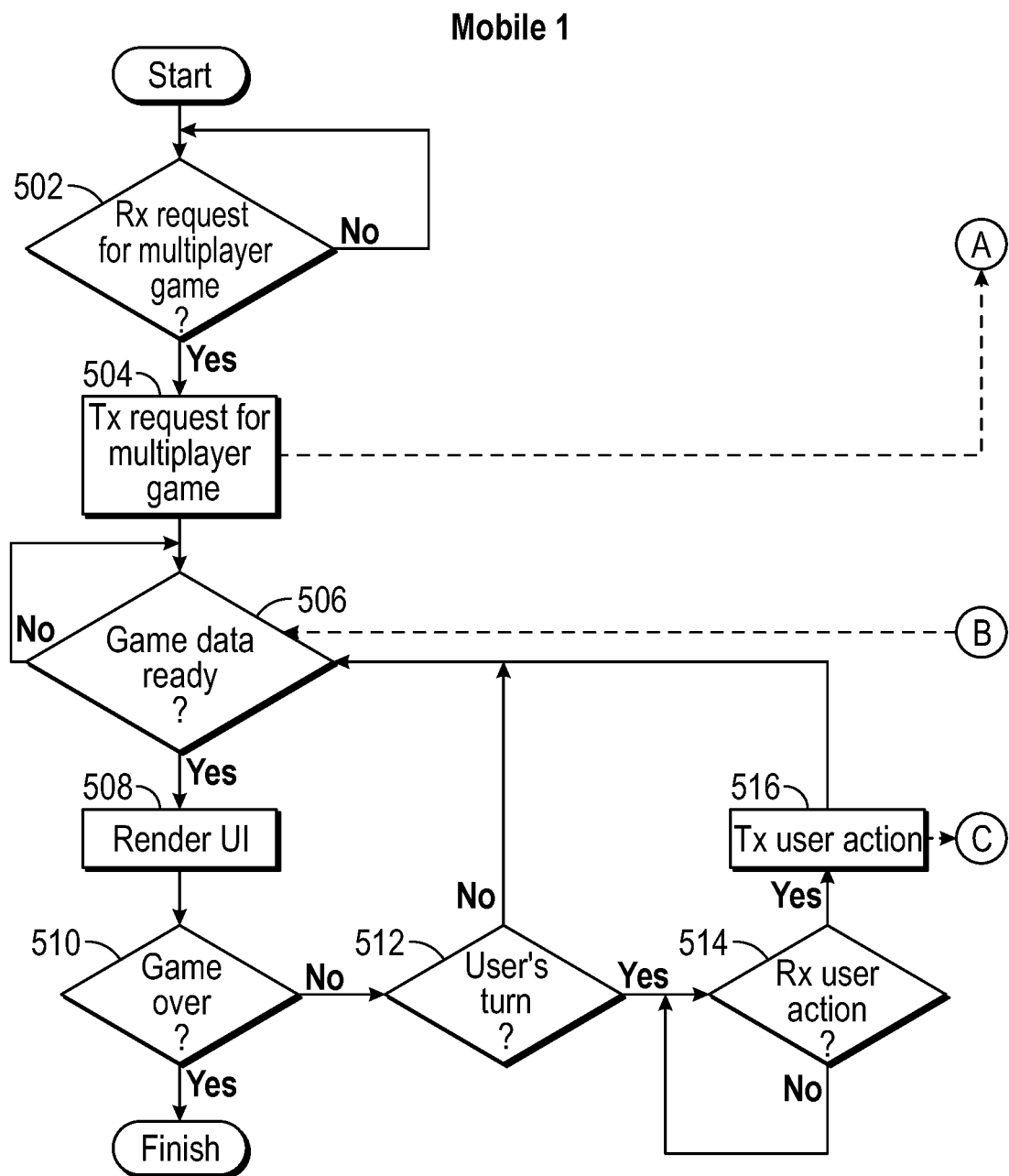
FIG. 5 is a flowchart illustrating an example operation of the game playing system with multiple users, according to an embodiment of the present disclosure.
Figure 5:
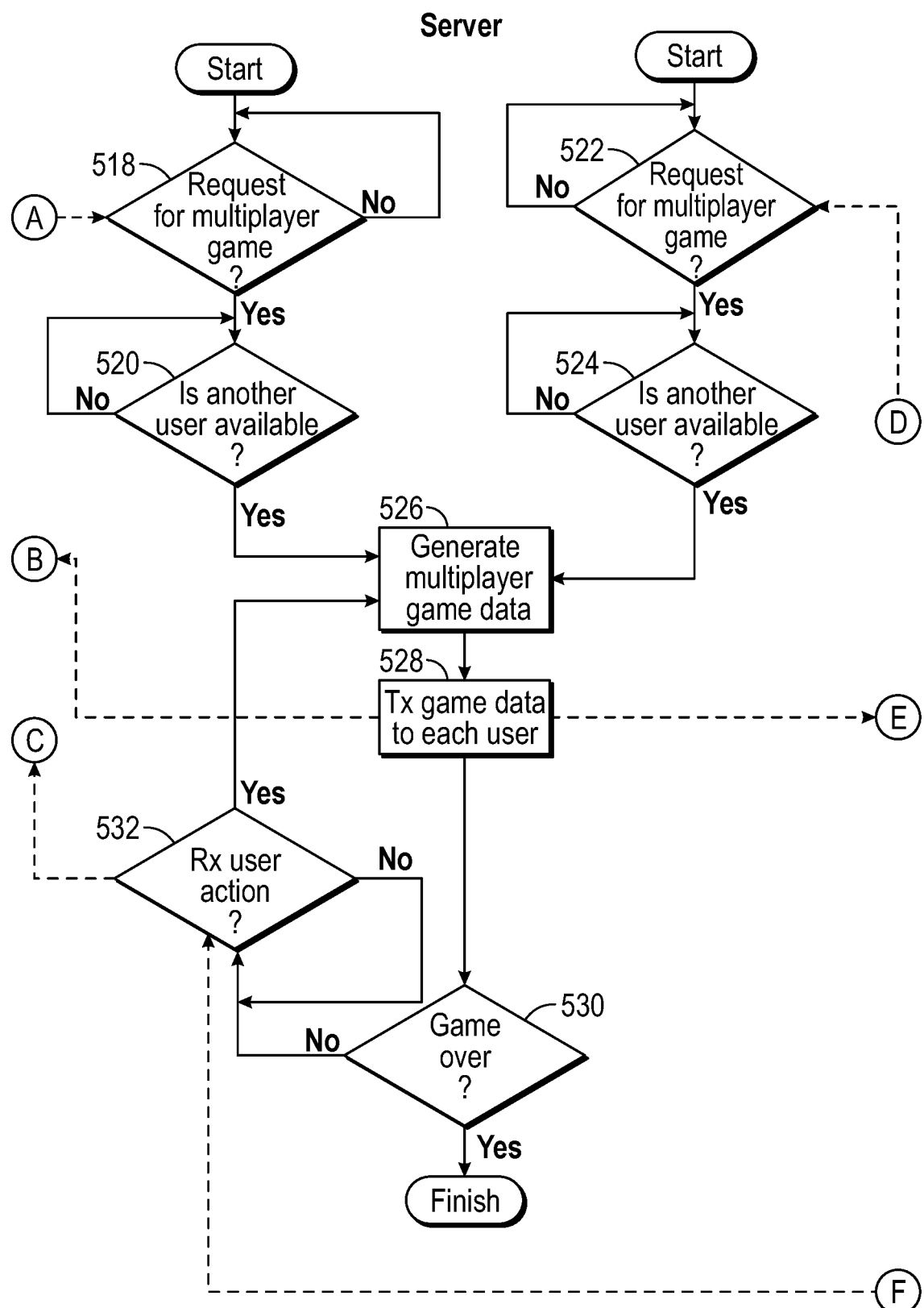
Figure 5:
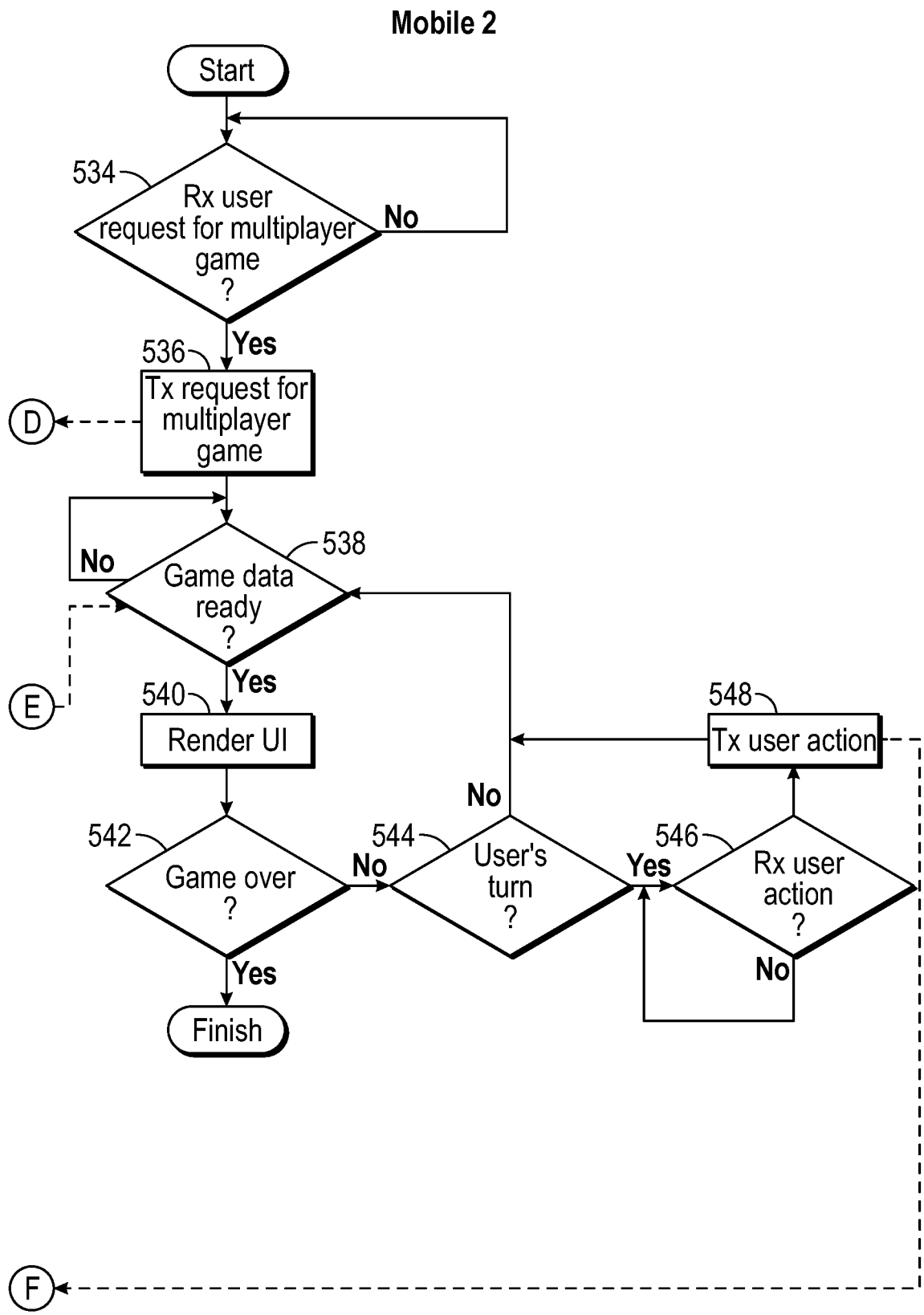

FIG. 5 is a flowchart for a multiuser game with user actions that comprise multiple computing devices, including, for example, mobile devices, and a computing system. In this example, FIG. 5 illustrates the actions of the mobile device and server for a two user game, but the same idea can be extended to more than two users. Three independent, but related, processes are described: a first client side process, a server side process, and a second client side process. The following example illustrates a game with two user actions per side, but the method disclosed is in no way limited to only two user action per side.

On the client side, the first client process, which may run on computing device 135, starts at block 502, which is a decision block that asks whether a user action has been received. If no user action has been received, the first client side process loops back to block 502. If a user action is received, the first client side process moves to block 504. At this point, a first user makes a first user action by requesting to play a multiuser game, which is the first user action data. The first client side process then moves to block 504, where the first user app module 140 sends the first user action data to the network 130, which then transmits the first user action data to the computing system 100. The first client process then moves to block 506, a decision block which asks whether game data is ready. If it is not, the first client process loops back to block 506. If it is, the first client process moves to block 508. At this point, game data is not ready, so the first client side process loops back to block 506.

On the server side, a first server side process, which may run on computing system 100, begins at block 518, a decision block which asks whether a request for a multiuser game has been received. If it has not, the first server side process loops back to block 518. When the server app module receives the first user action data requesting a multiuser game, the first server side process moves to block 520, a decision block which asks whether another user is available to play a multiuser game. If another user is available, the first server side process moves to block 526. If another user is not available, the first server side process loops back to block 520. At this point, another user is not yet available, so the first server side process loops back to block 520.

On the client side, the second client process, which may run on computing device 145, starts at block 534, which is a decision block that asks whether a user action has been received. If no user action has been received, the second client side process loops back to block 534. If a user action is received, the second client side process moves to block 536. At this point, a second user makes a second user action by requesting to play a multiuser game, which is the second user's first action data. The second client side process then moves to block 536, where the second user app module 150 sends the second user's first action data to the network 130, which then transmits the second user action data to the computing system 100. The second client process then moves to block 538, a decision block which asks whether game data is ready. If it is not, the second client process loops back to block 538. If it is, the second client process moves to block 540. At this point, game data is not ready, so the second client side process loops back to block 538.

On the server side, a second server side process, which may also be running on computing system 100, begins at block 522, a decision block which asks whether a request for a multiuser game has been received. If it has not, the second server side process loops back to block 522. If it has, the second server side process moves to block 524. When the server app module receives the second user action data requesting a multiuser game, the second server side process moves to block 524, a decision block which asks whether another user is available to play a multiuser game. If another user is available, the second server side process moves to block 526. If another user is not available, the second server side process loops back to block 524.

At this point, two users are available, so both the first and second server side processes merge into a combined server side process which begins at block 526. In block 526, the combined server side process generates the first set of multiuser game data. The combined server side process then moves to block 528, where it sends the first set of multiuser game data to the network 130, which transmits the data to each of the computing devices 135 and 145. The combined server side process then moves to block 530, a decision block which asks whether the game is over. If it is, the combined server side process would be finished. If not, the combined server side process moves to block 532, a decision block that asks whether any user actions have been received. At this point, two user actions on each client side have not been received, so combined server side process moves to block 532.

On the first client side, at this point, the first set of game data is ready, so the first client process proceeds from block 506 to block 508. In block 508, the first user app module 140 renders the UI with the first set of game data. The first client process then moves to block 510, a decision block which asks whether the game is over. If it is, the first client process is finished. If it is not, the first client process moves to block 512. Since both users have not had a chance to make two user actions yet, the game is not over, so the first client process moves to block 512. Block 512 is another decision block which asks whether it is the first user's turn. If it is, the first client process moves to block 514. If it is not, the first client process moves back to block 506. In this case, it is the first user's turn, so the first client process moves to block 514.

Block 514 is a decision block that asks whether the user app module 140 has received a user action yet. If it has, then the first client side process moves to block 516. If it is not, then the first client side process loops back to block 514. When the first user makes a second user action, the first client process moves to block 516, where the first user app module 140 sends the first user's second user action data to the network 130, which then transmits the first user's second user action data to the computing system 100. The first client process then moves to block 506. At this point, game data is not ready, so the first client side process loops back to block 506.

On the second client side process, at this point, the first set of game data is ready, so the second client side process proceeds from block 538 to block 540. In block 540, the second user app module 150 renders the UI with the second set of game data. The second client process then moves to block 542, a decision block which asks whether the game is over. If it is, the second client process is finished. If it is not, the second client process moves to block 544. Since both users have not had a chance to make two user actions yet, the game is not over, so the second client process moves to block 544. Block 544 is another decision block which asks whether it is the second user's turn. If it is, the second client process moves to block 546. If it is not, the second client process moves to block 538. In this case, it is not the second user's turn, so the second client process moves to block 538. At this point, the second set of game data is not ready, so the second client process loops back to block 538.

On the server side, the server side process was at block 532, awaiting a user's action. Since the first user's second user action is now ready, the server side process moves to block 526, where it generates the second set of multiuser game data. The server side process next moves to block 528, where it sends the second set of multiuser game data to the network 130, which transmits the data to each of the computing devices 135 and 145. The combined server side process then moves to block 530. At this point, the game is not over, so the combined server side process moves to block 532. At this point, the second user's second user data has not yet been received, so the combined server side process loops back to block 532.

On the first client side, at this point, the second set of game data is ready, so the first client process proceeds from block 506 to block 508. In block 508, the first user app module 140 renders the UI with the second set of game data. The first client process then moves to block 510. Since both users have not had a chance to make two user actions yet, the game is not over, so the first client process moves to block 512. At this point, it is not the first user's turn, so the first client process moves to block 506. At this point, game data is not ready, so the first client process loops back to block 506.

On the second client side, at this point, the second set of game data is ready, so the second client process proceeds from block 538 to block 540. In block 540, the second user app module 150 renders the UI with the second set of game data. The second client process then moves to block 542. Since both users have not had a chance to make two user actions yet, the game is not over, so the second client process moves to block 544. At this point, it is the second user's turn, so the second client process moves to block 546.

When the second user makes a second user action, the second client process moves to block 548, where the second user app module 150 sends the second user's second user action data to the network 130, which then transmits the second user's second user action data to the computing system 100. The second client process then moves to block 538. At this point, game data is not ready, so the second client side process loops back to block 538.

On the server side, the server side process was at block 532, awaiting a user's action. Since the second user's second user action is now ready, the server side process moves to block 526, where it generates the third set of multiuser game data. The server side process moves to block 528, where it sends the third set of multiuser game data to the network 130, which transmits the data to each of the computing devices 135 and 145. The combined server side process then moves to block 530. At this point, both users have had a chance to make two user actions, so the game is over. The server side process terminates.

On the first client side, at this point, the third set of game data is ready, so the first client process proceeds from block 506 to block 508. In block 508, the first user app module 140 renders the UI with the third set of game data. The first client process then moves to block 510. Since both users have had a chance at a turn, the game is over, and the first client side process terminates.

On the second client side, at this point, the third set of game data is ready, so the second client process proceeds from block 538 to block 540. In block 540, the second user app module 150 renders the UI with the third set of game data. The second client process then moves to block 542. Since both users have had a chance at a turn yet, the game is over, and the second client side process terminates.

Example Gaming Process

Figure 6:
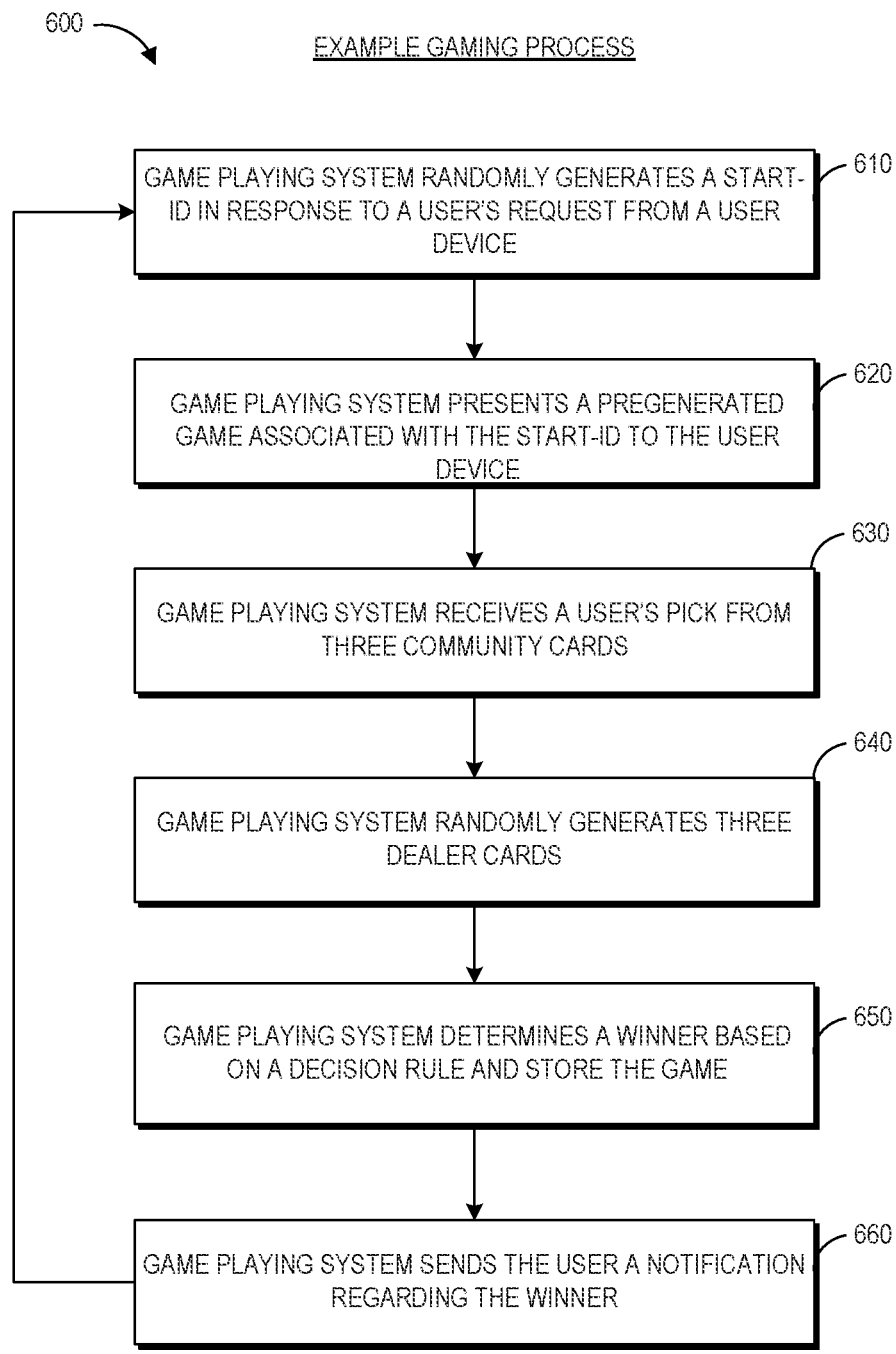
FIG. 6 is a flowchart illustrating an example game process according to an embodiment of the present disclosure.

FIG. 6 is a flowchart illustrating an example game process 600 according to an embodiment of the present disclosure. At block 610, in response to a request from a user to play a game via a user device, the system can randomly generate a start-ID (e.g., a unique identifier). The generated start-ID may be chosen from a pre-defined range. In some embodiments, the pre-defined range may depend on a number of users in the game. The generated start-ID may be a unique identifier associated with a set of pregenerated cards.

At block 620, the system presents a set of pregenerated game data associated with the generated start-ID to the user. The set of pregenerated game data may include three cards for player-hand and three community cards. The user may pick one card from the three community cards. The user may also place a bet. Upon receiving the user's picked card at block 630, the system may generate three cards for dealer-hand from the remaining deck at 640.

The system can compare the four cards for the user (three cards for the player-hand and one picked community card) with the three cards for the dealer-hand. The system can determine a winner based on the Badugi rules at block 650. The system can then store the data associated the game (e.g., bet information) in the mass storage. The system can notify the user regarding the winner at block 660. The user can then request to play another game with the system.

In some embodiments, in response to the request, the system may pre-generate multiple (e.g., ten) start-IDs. The system can store the multiple pregenerated start-IDs in an ID list in a memory 110. After finishing a game, the user may request to play another game with the system. The system can then present a second set of pregenerated game data associated with a second start-ID in the ID list to the user.

The invention claimed is:

1. A database processing system including a server and a data repository including one or more databases, the database system comprising:
   the data repository comprising:
     one or more databases configured to store:
       user information of one or more of users, and
       a plurality of sets of pregenerated game data, wherein each of the set of pregenerated game data further comprises data associated with three user cards, three community cards and cards in a remaining deck; and
   the server configured to:
   generate, in response to a first request from a first computing device over a network to play a game, a first plurality of unique identifiers, wherein each of the unique identifiers corresponds to a set of pregenerated game data;
   retrieve a first set of pregenerated game data associated with a first unique identifier of the first plurality of unique identifiers;
   transmit, to the first computing device, a first set of three user cards and a first set of three community cards associated with the first set of pregenerated game data;
   obtain, during a first interaction from the first computing device, a selection of a card from the first set of three community cards;
   generate, in response to the first interaction, a first set of three dealer cards; and
   compute and transmit, to the first computing device, a first game result based on a first user hand comprising the first set of three user cards and the selected card from the first set of three community cards, a first dealer hand comprising the first set of three dealer cards and two remaining cards from the first set of three community cards, and a comparison between the first user hand and the first dealer hand.

2. The system of claim 1, wherein the server is further configured to:
   retrieve, in response to a second request from the first computing device to play the game, a second set of pregenerated game data associated with a second unique identifier of the first plurality of unique identifiers from the data repository;
   transmit, to the first computing device, a second set of three user cards and a second set of three community cards associated with the second set of pregenerated game data;
   obtain, during a second interaction from the first computing device, a selection of a card from the second set of three community cards;
   generate, in response to the second interaction, a second set of three dealer cards; and
   compute and transmit, to the first computing device, a second game result based on a second user hand comprising the second set of three user cards and the picked card from the second set of three community cards, a second dealer hand comprising the second set of three dealer cards and two remaining cards from the second set of three community cards, and a comparison between the second user hand and the second dealer hand.

3. The system of claim 1, wherein the comparison between the first user hand and the first dealer hand is between suits and ranks of the first user hand and the first dealer hand.

4. The system of claim 1, wherein the server is further configured to store the first game result, the first set of three dealer cards, the first user interaction, and the first set of pregenerated game data in the one or more databases.

5. The system of claim 1, further comprising a machine learning component, wherein the machine learning component is configured to:
   conduct a first predictive analysis based on the first interaction and a size of a wager associated with the first interaction; and
   recommend a first advisor to the user based at least partly on the first predictive analysis.

6. The machine learning component of claim 5, wherein the first advisor is associated with an aggressiveness level.

7. The machine learning component of claim 5, wherein the first advisor recommends a game strategy to the user based on the first predictive analysis.

8. The machine learning component of claim 5, wherein the first predictive analysis further indicates any of the following: a potential game offer to the user, a prediction whether the user is likely to be a paying user, and a personalized recommendation.

9. The machine learning component of claim 5, further being configured to:
   update information based at least partly on one or more game results after the recommended the first advisor;
   conduct a second predictive analysis based on the updated information; and
   recommend a second advisor based at least partly on the second predictive analysis.

10. A database processing method executed on a server to retrieve and store data in one or more databases of a data repository, the database processing method comprising:
    storing user information of one or more of users, and one or more sets of pregenerated game data in one or more databases, wherein each of the set of pregenerated game data further comprises data associated with three user cards, three community cards and cards in a remaining deck;
    generating, in response to a first request from a first computing device over a network to play a game, a first plurality of unique identifiers, wherein each of the unique identifiers corresponds to a set of pregenerated game data;
    retrieving a first set of pregenerated game data associated with a first unique identifier of the first plurality of unique identifiers;

transmitting, to the first computing device, a first set of three user cards and a first set of three community cards associated with the first set of pregenerated game data;

obtaining, during a first interaction from the first computing device, a selection of a card from the first set of three community cards;

generating, in response to the first interaction, a first set of three dealer cards; and computing and transmitting, to the first computing device, a first game result based on a first user hand comprising the first set of three user cards and the selected card from the first set of three community cards, a first dealer hand comprising the first set of three dealer cards and two remaining cards from the first set of three community cards, and a comparison between the first user hand and the first dealer hand.

11. The method of claim 10, further comprising:
retrieving, in response to a second request from the first computing device to play the game, a second set of pregenerated game data associated with a second unique identifier of the first plurality of unique identifiers from the data repository;

transmitting, to the first computing device, a second set of three user cards and a second set of three community cards associated with the second set of pregenerated game data;

obtaining, during a second interaction from the first computing device, a selection of a card from the second set of three community cards;

generating, in response to the second interaction, a second set of three dealer cards; and computing and transmitting, to the first computing device, a second game result based on a second user hand comprising the second set of three user cards and the selected card from the second set of three community cards, a second dealer hand comprising the second set of three dealer cards and two remaining cards from the second set of three community cards, and a comparison between the second user hand and the second dealer hand.

12. The method of claim 10, wherein the comparison between the first user hand and the first dealer hand is between suits and ranks of the first user hand and the first dealer hand.

13. The method of claim 10, further comprising storing, by the server, the first game result, the first set of three dealer cards, the first user interaction, and the first set of pregenerated game data in the one or more databases.

14. The method of claim 10 further comprising:
conducting a first predictive analysis based on the first interaction and a size of a wager associated with the first interaction; and
recommending a first advisor to the user based at least partly on the first predictive analysis.

15. The method of claim 14, wherein the first advisor is associated with an aggressiveness level.

16. The method of claim 14, wherein the first advisor recommends a game strategy to the user based on the first predictive analysis.

17. The method of claim 14, wherein the first predictive analysis further indicates any of the following: a potential game offer to the user, a prediction whether the user is likely to be a paying user, and a personalized recommendation.

18. The method of claim 14, further comprising:
updating information based at least partly on one or more game results after the recommended the first advisor;
conducting a second predictive analysis based on the updated information; and
recommending a second advisor based at least partly on the second predictive analysis.

19. A computing device comprising:
one or more processors; and
a memory storing instructions that, when executed by the one or more physical processors, cause the computing device to:
present, on an interface, in response to an acceptance of a request to play a game:
a first field comprising an identification of the game;
a dropdown menu that provides a selection of a number of players of the game;
a second field to receive an entry of a wager size;
a third field indicating a first set of three community cards;
a fourth field indicating a second set of three cards that belong to a player;
a fifth field indicating a third set of three cards that belong to a dealer;
a sixth field indicating a status of whether the second set comprises unfolded cards; and
a seventh field indicating directions to play the game.

20. The computing device of claim 19, wherein the instructions further cause the computing device to:
receive a selection of a card from the first set;
populate a second interface that comprises a recommendation of the wager size; and
present, on the interface, an eighth text field indicating a best hand of the dealer and a ninth text field indicating a best hand of the player.

* * * * *